(12) United States Patent
Bookbinder et al.

(10) Patent No.: US 7,526,166 B2
(45) Date of Patent: Apr. 28, 2009

(54) HIGH NUMERICAL APERTURE FIBER

(75) Inventors: Dana Craig Bookbinder, Corning, NY (US); Ming-Jun Li, Horseheads, NY (US); Michael Thomas Murtagh, Painted Post, NY (US); Daniel Aloysius Nolan, Corning, NY (US); Pushkar Tandon, Corning, NY (US); Ji Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 189 days.

(21) Appl. No.: 11/701,287

(22) Filed: Jan. 31, 2007

(65) Prior Publication Data

US 2008/0181567 A1 Jul. 31, 2008

(51) Int. Cl.
   *G02B 6/32* (2006.01)
(52) U.S. Cl. .................. 385/125; 385/123; 385/126; 385/127
(58) Field of Classification Search .............. 385/123, 385/124, 125, 126, 127
   See application file for complete search history.

(56) References Cited

U.S. PATENT DOCUMENTS

| 6,115,526 | A * | 9/2000 | Morse | 385/125 |
|---|---|---|---|---|
| 6,483,973 | B1 * | 11/2002 | Mazzarese et al. | 385/123 |
| 6,625,363 | B2 * | 9/2003 | Carter et al. | 385/127 |
| 6,687,445 | B2 * | 2/2004 | Carter et al. | 385/127 |
| 7,139,458 | B2 | 11/2006 | Koh et al. | 385/127 |
| 7,158,705 | B2 | 1/2007 | Berkey et al. | 385/123 |
| 7,203,407 | B2 | 4/2007 | Berkey et al. | 385/123 |
| 7,313,312 | B2 | 12/2007 | Kimball et al. | 385/142 |
| 2002/0012512 | A1 | 1/2002 | Elrefaie et al. | 385/125 |
| 2002/0191928 | A1 * | 12/2002 | Carter et al. | 385/127 |
| 2004/0005130 | A1 | 1/2004 | Yamamoto et al. | 385/123 |
| 2005/0105867 | A1 | 5/2005 | Koch et al. | 385/125 |
| 2006/0263024 | A1 | 11/2006 | Dong et al. | 385/125 |
| 2007/0104437 | A1 | 5/2007 | Bookbinder et al. | 385/125 |

OTHER PUBLICATIONS

"500 W continuous-wave fibre laser with excellent beam quality"; J. Limpert et al; Electronics Letters, Apr. 17, 2003; vol. 39; No. 8; pp. 645-647.
"High-Power Double-Clad Fiber Lasers"; Luis Zenteno; Journal of Lightwave Technology; vol. 11, No. 9, Sep. 1993; pp. 1435-1446.
"Kilowatt-class single-frequency fiber sources"; D. N. Payne et al; Proceedings of SPIE vol. 5709; pp. 133-141.

(Continued)

*Primary Examiner*—James P Hughes
(74) *Attorney, Agent, or Firm*—Svetlana Z. Short (57) ABSTRACT

An optical fiber comprising: a silica based core having a first index of refraction $n_1$; and at least one silica based cladding surrounding the core, the at least one silica based cladding comprising index lowering non-periodic voids containing a gas, wherein at least 80% of said voids have a maximum cross-sectional dimension of less than 2000 nm, and the NA of the fiber layer situated immediately adjacent to and inside said at least one silica based cladding is at least 0.2.

22 Claims, 9 Drawing Sheets

OTHER PUBLICATIONS

"Effect of coating heating by high power in optical fibres at small bend diameters"; Electronics Letters, Jun. 12, 2003; vol. 39; No. 12; pp. 897-898.

"Novel Fiber Lasers and Applications"; L. Zenteno et al; Advances in Fiber Devices, Proceedings of SPIE; vol. 4974; (2003); pp. 65-74.

"Silica-Air Double-Clad Optical Fiber"; IEEE Photonics Technology Letters; vol. 12; No. 8; Aug. 2000; p. 1007-1009.

"Optical Data Buses for Automotive Applications"; Journal of Lightwave Technology, vol. 22, No. 9; Sep. 2004; pp. 2184-2199.

* cited by examiner

HIGH NUMERICAL APERTURE FIBER

BACKGROUND OF THE INVENTION

1. Field of the Invention

The present invention relates generally to high NA optical fibers, including fibers with high NA large cores for short distance communication systems, or with high NA claddings in double clad fibers for use with high power light sources or in optical fiber lasers and optical amplifiers.

2. Technical Background

Optical fiber has become a favorite medium for telecommunications due to its high capacity and immunity to electrical noise. Optical fibers have also been utilized in automotive applications because they offer high bandwidth, are relatively inexpensive, and can be used in automotive optical data systems to provide optical data for information system, entertainment, engine management and safety systems. Such fibers require high numerical aperture of the fiber core and a large core, to provide for efficient coupling of light into the fiber core. Two types of optical fiber are now utilized in automotive applications. They are polymer optical fibers (POFs) and polymer cladded silica (PCS) optical fiber. It is the relatively low index of refraction of polymer that provides a high core NA. The main draw back of POF fiber is its relatively high attenuation at the wavelength of interest (as high as 0.3 dB/m to 0.4 dB/m for 630 nm<λ<685 nm) and relatively narrow temperature range of operation (−45° C. to 85° C.). For applications such as sensor systems for safety, engine management system it is preferable to have wider operating fiber temperature range, while applications such as video processing systems require a fiber with better attenuation. PCS fiber can operate in a somewhat broader temperature ranges (−65° C. to 125° C.), and have a lower attenuation than the POF fiber. However, at higher temperatures, PCS of optical fiber heats and the polymer material of the outer cladding layer carbonizes or burns, resulting in device failure, especially when the fiber is bent. Even at the temperatures between 85° C. and 125° C., the polymer cladding ages relatively quickly, losing its mechanical and optical characteristics and becoming brittle, thus shortening the device life. Finally, both of these types of fiber suffer from bend losses.

Single clad rare earth doped optical fiber has been widely used in the field of optical amplifiers and fiber lasers. This type of fiber has low capability of handling high power multimode optical sources due to the difficulty of efficiently coupling multimode light from a high power optical (light) source (also referred to herein as optical pump or pump) into the rare-earth doped fiber core.

To solve this problem and to increase the output power of fiber lasers, those of skill in the art utilize optical fiber with a double clad structure (referred herein as double clad optical fiber). Double clad rare-earth doped optical fiber is a fiber that has a core, an inner cladding layer surrounding the core and an outer cladding layer surrounding the inner cladding layer.

Double clad optical fiber has been used in applications requiring utilization of optical sources providing between 10 to 100 Watts of optical power, because double clad optical fiber is more efficient than single clad optical fiber in retaining and in utilizing optical power provided by the pump. This higher efficiency is due to fiber's utilization of inner clad-to-core coupling of optical pump power. More specifically, rare-earth doped double clad optical fibers accept light from the optical pump into the inner cladding and then transfer light to the rare-earth doped core through the core-to-inner cladding interface, along the length of the optical fiber. Thus, the optical fiber converts a significant part of the multi-mode light propagated through the inner cladding into a single-mode output at a longer wavelength, by coupling this pump light into the rare-earth doped core.

The inner cladding of the double clad optical fiber has a higher index of refraction than the outer cladding, thus the pump energy is confined inside the inner cladding and is re-directed into the core. The optical fiber is optically active due to the presence of rare-earth dopant in the core, which can be excited to higher electronic energy levels when the optical fiber is pumped by a strong optical pump. Cladding pumping can be utilized in fiber amplifiers, or employed to build high-power single mode fiber pump lasers.

In a double-clad laser, an outer cladding of the optical fiber confines the pump light provided by an optical pump in the optical fiber's multi-mode inner cladding. The much smaller cross-sectional area of the optical fiber's core is typically doped with at least one rare-earth element, for example, neodymium or ytterbium, to provide lasing capability in a single-mode output signal. The double-clad arrangement facilitates pumping of the fiber using a multi-mode first cladding for accepting and transferring pump energy to a core along the length of the device.

How much pump light can be coupled into a double-clad fiber's inner cladding depends on the cladding size and numerical aperture NA. Typically, a high numerical aperture NA of the inner cladding, which is related to the difference in refractive index between the inner and outer cladding, is desired. In the well-known design, the first clad layer (inner cladding) is made of glass and the second layer (outer cladding) is made of plastic (for example, fluorinated polymer) with relatively low refractive index in order to increase the numerical aperture NA of the inner cladding. Such plastic may not have the desired thermal stability for many applications, may delaminate from the first cladding, and may be susceptible to moisture damage. In addition, this type of double clad optical fiber may be suitable only for sustained use with relatively low power (lower than 20 Watts) optical sources. When high power sources (more than 100 Watts) are utilized, this type of optical fiber heats and the polymer material of the outer cladding layer carbonizes or burns, resulting in device failure, especially when the fiber is bent. At medium powers (20 Watts to below 100 Watts), the polymer outer cladding ages relatively quickly, losing its mechanical and optical characteristics and becoming brittle, thus shortening the device life.

SUMMARY OF THE INVENTION

One aspect of the invention is an active optical fiber comprising: a silica based core having a first index of refraction $n_1$; and at least one silica based cladding surrounding the core, the at least one silica based cladding having a second index of refraction $n_i$, such that $n_1 > n_i$; the at least one silica based cladding comprises non-periodic index lowering voids containing gas, wherein at least 80% of said voids have a maximum cross-sectional dimension of less than 2000 nm. The numerical aperture NA of the fiber layer situated immediately adjacent to and inside this at least one silica based cladding with the voids is at least 0.2, preferably at least 0.25, more preferably at least 0.3, even more preferably at least 0.35, and most preferably at least 0.4 and higher. Preferably, the fiber cross-section contains at least 50 voids.

Preferably, in these fibers $\lambda_{NA}/D_i > 2$, and more preferably $\lambda_{NA}/D_i > 4$, where $\lambda_{NA}$ is the wavelength for measuring said NA and Di is the mean void diameter. Also, preferably, at least 80% of said voids have a maximum cross-sectional dimension of less than 500 nm.

In one embodiment of the present invention the optical fiber is an active optical fiber comprising: (i) a silica based, rare earth doped core having a first index of refraction $n_1$; (ii) a silica based inner cladding surrounding the core having a second index of refraction $n_2$, such that $n_1 > n_2$; and (iii) a silica based outer cladding surrounding the first cladding, the outer cladding further comprising index lowering voids containing gas, wherein at least 80% the voids having a maximum (cross-sectional) dimension of less than 2000 nm. Preferably, the inner cladding has a numerical aperture between 0.2 and 0.8 or higher, for example 0.3, 0.4, 0.5, 0.6, 0.7 or 0.8.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description, serve to explain the principles and operations of the invention.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numerals will be used throughout the drawings to refer to the same or like parts. Two embodiments of a fiber 10 with a high numerical aperture layer according to the present invention are shown schematically in FIGS. 1A and 1C.

The optical fiber 10 of FIGS. 1A-1E includes a silica based core 12 having a first index of refraction $n_1$; and at least one silica based cladding 16 surrounding the core 12. The at least one silica based cladding includes index lowering voids containing gas, wherein at least 80% of the voids have a maximum cross-sectional dimension of less than 2000 nm. Preferably, the fiber cross-section contains at least 50 voids. The NA of the fiber layer situated immediately adjacent to and inside the at least one silica based cladding 16 is preferably at least 0.2, more preferably at least 0.3, and even more preferably at least 0.35 and most preferably 0.5 or higher. The numerical aperture NA of a fiber layer defines its "light gathering ability" by defining the maximum angle to the fiber axis at which light will be accepted and propagated through the fiber layer. The numerical aperture is NA=sin θ, where θ is ½ of the acceptance angle of the incoming light coupled, for example, into the core or the inner cladding (see FIGS. 1D and 1E). For a layer of uniform material (i.e., void-free solid glass) with refractive index of $n_1$ situated inside a layer of uniform material with refractive index of $n_2$, the NA can be calculated using $(n_1^2 - n_2^2)^{1/2}$. However, for a layer of uniform material inside a layer containing voids, this simple equation can not be applied. Instead, the numerical aperture NA of this fiber layer can be determined by measuring the maximum acceptance angle 2θ of the light coupled into the layer, or maximum divergence angle 2θ of the light coupled out the layer. The measured NA is the sine of half the acceptance or divergence angle 2θ (See FIGS. 1D and 1E) that contains 90% of the optical power that is captured by the fiber layer (core or the inner cladding). Preferably, the ratio of the wavelength of interest (i.e., the signal, or the pump wavelength, or the wavelength for measuring said NA) to the mean void diameter is at least 2, and more preferably at least 3, more preferably at least 4, and in some embodiments, at least 5, and in some embodiments, about 10 (i.e., $\lambda_{NA}/D_i > 2$, where $\lambda_{NA}$ is the wavelength for measuring the NA and Di is the mean void diameter).

Figure 1A:
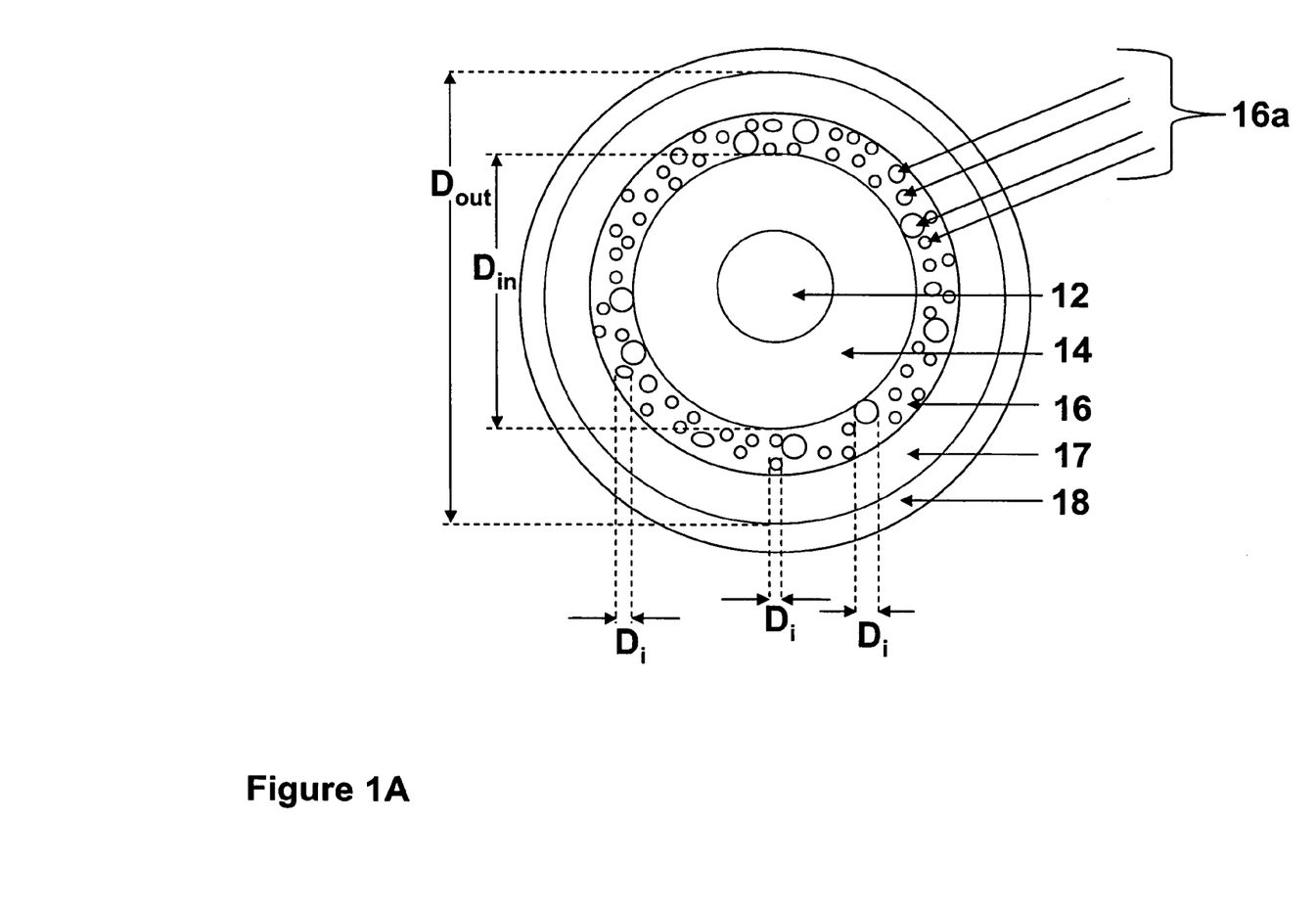
FIG. 1A is a schematic cross sectional view of one embodiment of the present invention.
Figure 1B:
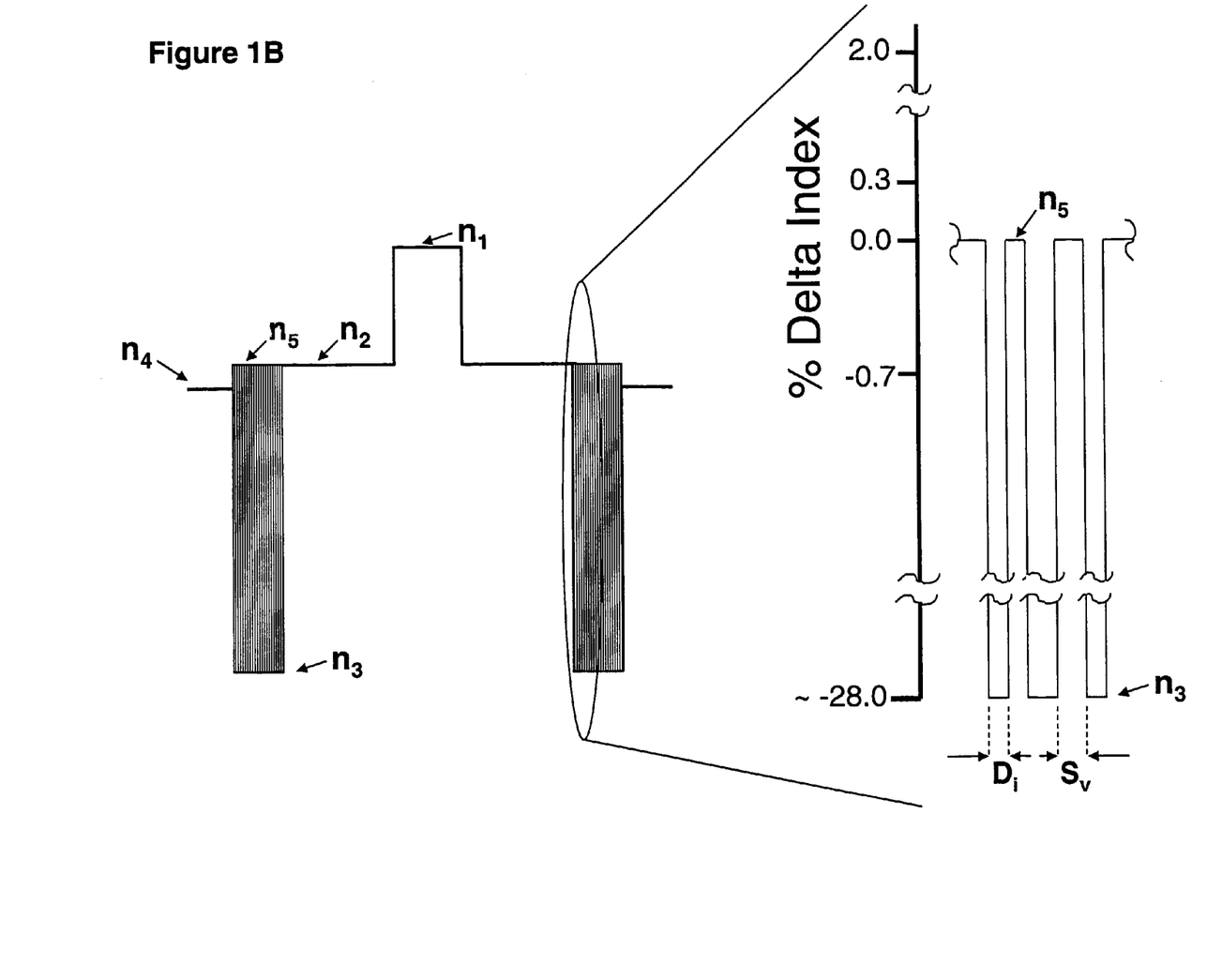
FIG. 1B is a schematic view of the index of refraction profile corresponding to the optical fiber of FIG. 1A.

In FIG. 1A fiber, the high numerical aperture layer is the inner cladding layer 14, which is situated adjacent to and is surrounded by the outer cladding layer 16. FIG. 1B corresponds to the fiber of FIG. 1A and illustrates schematically its refractive index profile. This figure illustrates that the relative percent index of refraction in cladding 16 fluctuates between $n_3 = -28\%$ (index of void filled gas relative to that of silica) and that of the glass surrounding the voids (in this example it is silica, with the relative % index of refraction $n_5$ of about 0%). A typical relative refractive index percent $n_5$ will be between −2% and 3%, relative to pure silica glass, depending on the dopants present in the glass surrounding the voids. That is, the index of cladding 16 fluctuates, and in the example of FIG. 1B, the width of the gas filled voids, and/or the glass filled spacing $S_v$ between the gas filled voids is randomly distributed and/or are not equal to one another. That is, the voids are non-periodic. It is preferable that the mean distance between the voids is less than 5000 nm, more preferably less than 2000 nm, even more preferably less than 1000 nm, for example 750 nm, 500 nm, 400 nm, 300 nm, 200 nm or 100 nm. The relative refractive index $n_4$ corresponds to the optional cladding layer 17. In exemplary fiber for automotive applications (shown in FIG. 1C) the high numerical aperture layer is the core layer 12, which situated adjacent to and is surrounded by the void containing outer cladding layer 16. Preferably, in both types of fiber, at least 80%, and more preferably at least 90% of the voids have a maximum cross-sectional dimension Di of less than 500 nm. Even more preferably, the mean diameter of the voids is less than 500 nm, and even more preferably less than 300 nm. The voids 16A are closed (surrounded by solid material) and are non-periodic. That is, the voids 16A may have the same size, or may be of different sizes. The distances between voids may be uniform (i.e., the same), or may be different.

It is preferable, for automotive applications that the fiber core diameter be 50 μm to 400 μm. A typical exemplary automotive fiber with voids containing cladding layer will have attenuation of less than 20 dB/km, preferably less than 10 dB/km, and more preferably less than 5 dB/km at 1550 nm. It is preferred that such fiber also has a bend loss of less than 1 dB/turn around a 10 mm mandrel (for a 125 micron diameter fiber). For high power laser and amplifier applications the core size will be smaller (5 μm to 50 μm) and will be doped with one or more active (rare earth) dopants.

More specifically, the optical fiber 10 illustrated in FIG. 1A includes: a silica based, rare earth doped core 12 having a first index of refraction $n_1$; a first silica based cladding 14 (also referred to as inner cladding herein) surrounding the core and having a second index of refraction $n_2$, such that $n_1 > n_2$; and a silica based outer cladding 16 surrounding the first cladding and having a third index of refraction $n_R$ which fluctuates and which comprises regions of refractive index of $n_5$ (glass) and $n_3$ (gas). These refractive indices are depicted, schematically, in FIG. 1B.

In the fibers for laser and or amplification application the core 12, inner cladding 14 and the outer cladding 16 are made of glass. For example, in the embodiments shown in FIGS. 1A and 1B the silica based core 12 is doped with Yb, but other rare earth materials, such as Er may also be utilized. The core 12 may also include at least one index raising dopant. In this embodiment of active fiber the preferable relative (to pure silica) core index change is about 0.1%-0.5%, and the preferred core width or radial distance is about 4 μm to 25 μm. In the disclosed embodiments the inner cladding 14 has numerical aperture NA greater than 0.2. Preferably, the inner cladding 14 has a numerical aperture NA of over 0.2, more preferably between 0.25 and 0.9, for example equal to or larger than 0.3, 0.33, 0.35, 0.38, 0.4, 0.45, 0.48, 0.5, 0.55, 0.6, 0.65, 0.7, 0.75, 0.8, or 0.85. The outer cladding 16 comprises index lowering voids 16A containing gas (also referred to as gas bubbles, gas filled voids, holes or airlines). The gas may comprise Ar or $N_2$ or $O_2$ or $CO_2$, or mixtures thereof and may be, for example, air. The most preferred gasses are argon or nitrogen). Preferably, these voids 16A have a maximum cross sectional dimension Di of less than 2000 μm. (As referred to herein, a cross section is a cross section perpendicular to the fiber axis.) Preferably, in order to minimize scattering of the pump light and to improve pumping efficiency, the outer cladding 16 has gas containing voids 16A with maximum (cross-sectional) dimensions $D_i$ below that of the pumping wavelength, for example below 1480 μm or 980 μm, more preferably below 750 nm, more preferably below 500 nm, and more preferably in some embodiments below 200 nm, even more preferably in some embodiments below 100 nm, and most preferably in some embodiments below 50 nm. This results in higher lasing or amplification efficiency due to more pump light entering the fiber core 12. An additional, optional glass cladding layer 17 may also be utilized, if needed. A protective coating 18 surrounds the outer cladding 16 and the additional optional cladding layer 17. The outer coating 18 may be, for example, an organic coating such as a polyimide or a UV cured acrylate or urethane acrylate.

As stated above, the silica based core 12 may be doped with Yb, but other rare earth materials, such as Er may also be utilized. A Yb-doped core will laze in the 1.03-1.11 micron range. The core 12 may also include at least one index raising dopant.

Preferably, for laser fiber applications, the inner cladding diameter $D_{IN}$ is at least 90 μm and more preferably at least 125 μm. If the inner cladding 14 does not have a circular cross section, $D_{IN}$ is defined as the smallest distance from one side of the inner cladding's cross section to the oppositely situated side of the cross section. It is preferable that the inner cladding diameter $D_{IN}$ be about 90 μm to 2000 μm, more preferably between 100 μm and 1700 μm and more preferably about 100 μm to 1500 μm. It is even more preferable that $D_{IN}$ be about 100 μm to 350 μm, for example 125 μm, 150 μm, or 200 μm. It is preferable that the inner cladding's cross-sectional area be at least 200 times larger than the cross sectional area of the core 12. It is even more preferable that the cross sectional area of the inner cladding 14 be between 100 and 3000 times larger than the cross sectional area of the core 12. For example, the cross sectional area of the inner cladding 14 may be 300, 500, 700, 1000, 1200, 1500, 1600, 2000 or 2500 times larger than the cross sectional area of the core 12. The thick inner cladding 14, gas containing voids 16A of the outer cladding 16, and all-glass construction of the optical fiber work in synergy to allow the optical fiber to be coupled to a high energy source, and to couple the high power into the core without damaging the optical fiber. Thus, such fiber is especially suitable for high optical power applications.

It is preferable that the silica based outer cladding 16 of this fiber embodiment be relatively thin, preferably with thickness equal to or less than 100 μm, more preferably less than 80 μm, and even more preferably less than 50 μm. For example, the exemplary thickness of the outer cladding 16 may be equal to or greater than 10 μm, 15 μm, 20 μm, 30 μm, 20 μm, 50 μm, 60 μm, 70 μm, 80 μm, 90 μm, 95 or 99 μm. It is preferable that the wall thickness of the outer cladding 16 be between about 10 μm to 50 μm and most preferable between about 10 μm to 30 μm. It is preferable that the diameter of the outer cladding diameter ($D_{OUT}$) be about 120 μm to 2100 μm, more preferably between about 125 μm to 1600 μm and even more preferable that $D_{OUT}$ be about 130 μm to 500 μm. It is also noted that the outer cladding may not be circular. If the outer cladding is not circular, $D_{OUT}$ is defined as the smallest distance from one side of the outer cladding's cross section to the oppositely situated side of the outer cladding's cross section.

According to one embodiment, the active fiber core 12 includes, in weight percent:

| | |
|---|---|
| Rare earth | 0.1 to 2.5 wt %; |
| P | 0 to 5 wt %; |
| Al | 0.5 to 15 wt %; |
| Ge | 0 to 15 wt %; |
| F | 0 to 1 wt %. |

The rare earth dopants in the fiber core 12 provide active ions to enable either a gain or a lasing action. Exemplary rare earth dopants are Yb, Er, Nd, Tm, Sm and Th. It is preferable that the amount of rare earth dopant in the core 12 be between 0.5 wt % to 1.5 wt %. Phosphorus may be added to the core materials in order to lower the softening temperature of the core glass, which may be advantageous if the core is produced by the inside vapor deposition process (described below). Phosphorus may also be utilized as a refractive index raising agent. However, less than 10% phosphorus is preferred, because too much phosphorus (10% or more) provides non-linearity through Stimulated Raman Scattering, which may inhibit the lasing action. Aluminum may be added to the core as a de-clustering agent (for example, to de-cluster Yb, preferably at the ratio of Al to Yb of 5:1 to 10:1). The core 12 may also include Germanium which is an index raising dopant, and/or fluorine which is an index lowering dopant as well as a de-clustering agent.

It is preferable that the inner cladding 14 of the active optical fiber contain 5 wt % to 20 wt % Ge to in order to provide high NA (numerical aperture), but the inner cladding 14 may be also undoped (pure) silica, if the gas containing voids 16A sufficiently lower the effective index of refraction of the outer cladding 16.

The amount of gas bubbles 16A in the outer cladding 16 is chosen to preferably result in inner cladding's NA of between 0.2 to 0.8 (for example, at least 0.3, 0.35, 0.4, 0.45, 0.5 or higher). The outer cladding material may also be doped with an index lowering dopant, for example, either fluorine or boron (F, B), or both, to help create the required low effective index of refraction in the outer cladding 16, and thus correspondingly high NA in the inner cladding 14.

One method of making an optical fiber with gas containing voids in the outer cladding comprises forming via chemical vapor deposition (CVD) operation a soot containing optical fiber preform. More specifically, a soot layer corresponding to the outer cladding 16 may be deposited on a consolidated fiber rod containing a core and an inner cladding, thus forming a final soot containing preform. The final soot preform is consolidated in a gaseous atmosphere which surrounds the preform under conditions which are effective to trap a portion of the gaseous atmosphere in the preform during the consolidation step. This consolidation steps results in the formation of non-periodically distributed holes or voids in outer layer of the consolidated preform, each hole corresponding to a region of at least one void containing gas. The consolidated preform having voids 16A (gas containing holes) in the second (outer layer) therein is then used to make an optical fiber. At least some of the gas containing voids formed in the outer layer of the optical fiber preform during the consolidation step remain in the second cladding layer 16 of drawn optical fiber. By designing the void containing region to correspond to the outer cladding of the optical fiber, these resultant optical fiber can be made to exhibit a first cladding with a first refractive index and a second cladding having a second refractive index significantly lower than that of the first cladding, the lower refractive index at least partly due to the presence of the gas containing voids 16A in the second (outer) cladding 16.

As captured above, the soot region of the preform is consolidated in a gaseous atmosphere which surrounds the preform under conditions which are effective to trap a portion of the gaseous atmosphere in the preform during the consolidation step, within a specified layer thickness. This can be done by controlling the amount and pressure of the gas (comprising, for example, Ar or $N_2$ or $O_2$ or $CO_2$, or mixtures thereof) to be trapped within the perform, soot thickness, sinter rate, and/or consolidation temperatures; this results in a void-containing sintered preform having closed porosity. This void-containing preform can be used directly as an optical fiber preform or be optionally redrawn and further overcladded with $SiO_2$ containing soot, then placed in a consolidation furnace and sintered to a final optical fiber preform. The void trapping consolidation step results in the formation of non-periodically distributed holes or voids in a layer of the consolidated preform, each hole corresponding to a region of at least one void containing gas. The void-containing consolidated preform having voids (gas containing holes) in the second (outer layer) therein is then used to make an optical fiber by drawing the consolidated void-containing preform in a fiber draw furnace where one can adjust the fiber drawing speed and temperature. Exemplary sintering and consolidation steps for creating gas containing voids 16A are described in more detail in U.S. patent application Ser. No. 11/583,098 filed on Oct. 18, 2006 and U.S. Patent Application 60/734,995 filed on Nov. 8, 2005, which is incorporated by reference herein.

Figure 2A:
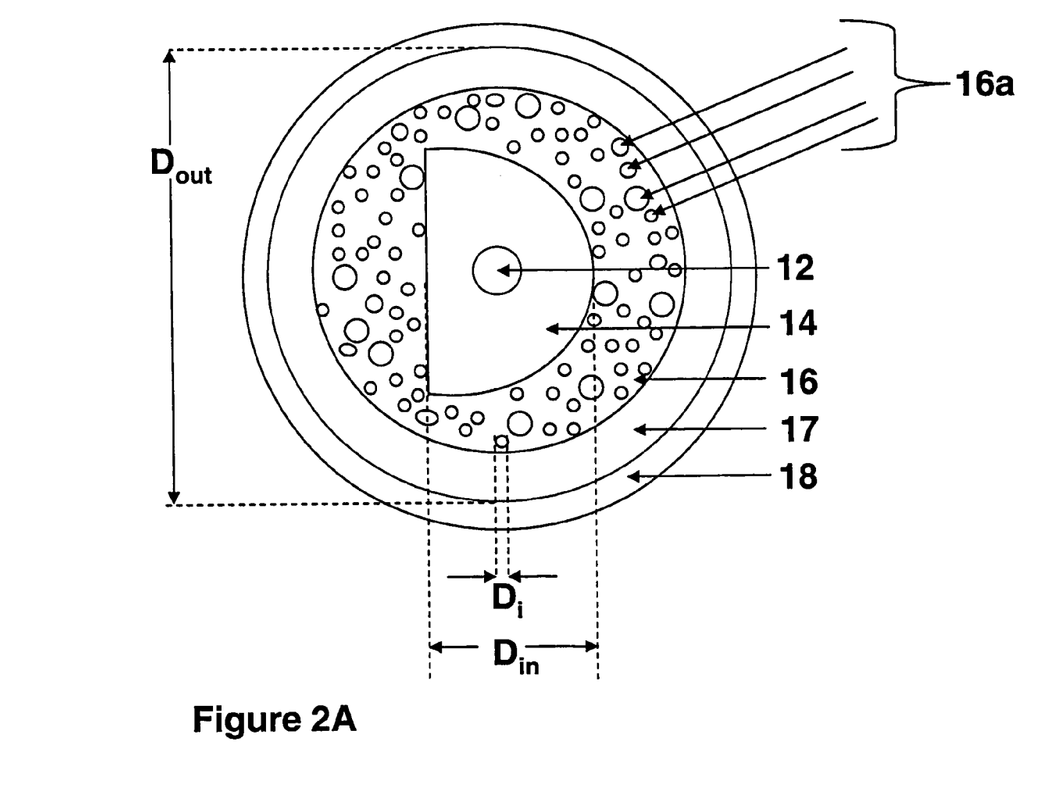
FIGS. 2A-2C are schematic cross sectional views of other embodiments of the optical fiber of the present invention.
Figure 2B:
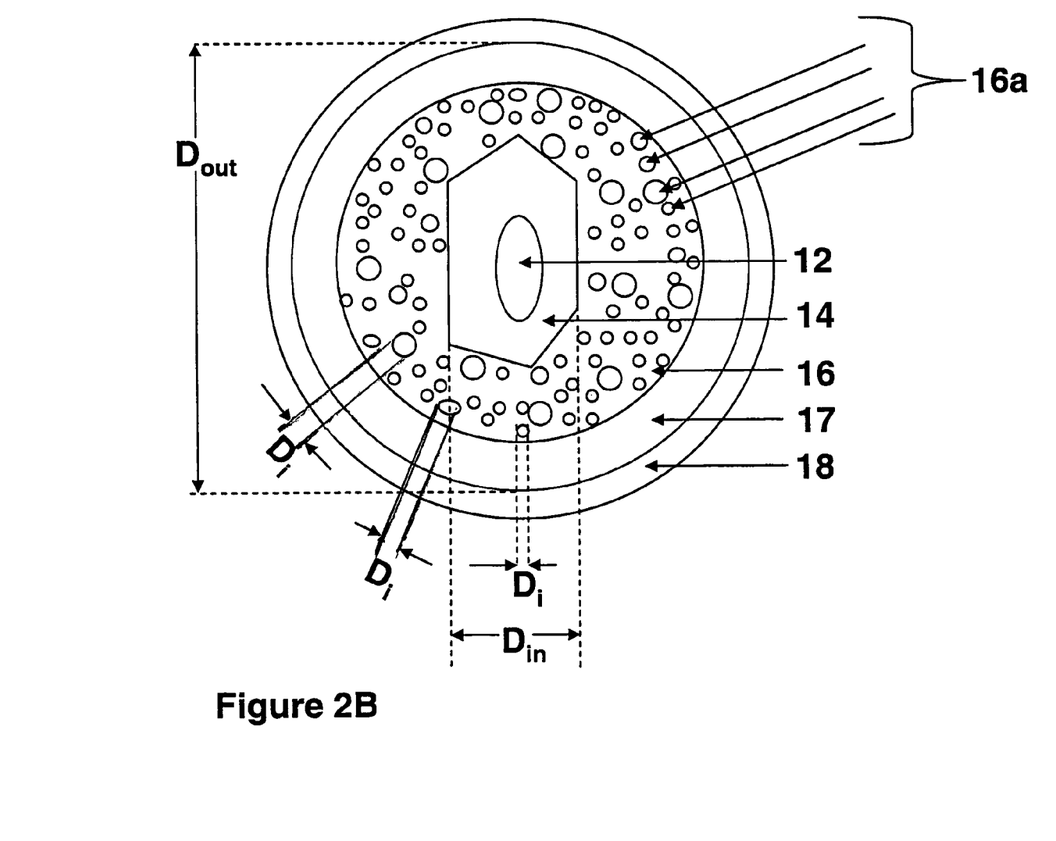
Figure 2C:
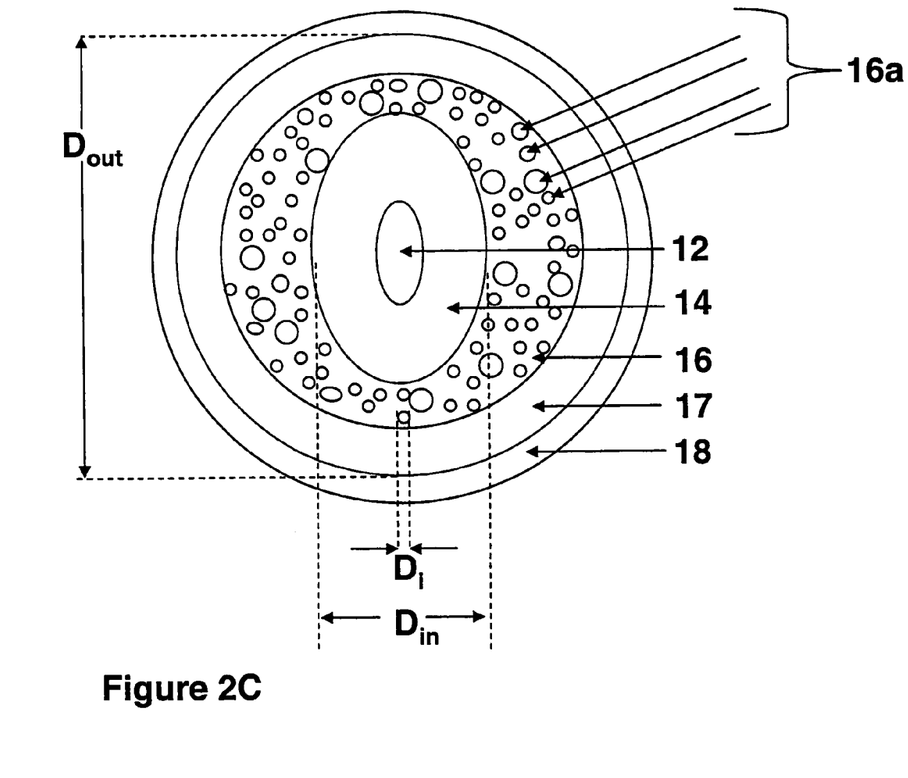

Other embodiments of the double clad optical fiber 10 of the present invention are shown schematically in FIGS. 2A-2C and are generally described and depicted herein with reference to several exemplary or representative embodiments with the same numbers referenced to the same or functionally similar parts. The optical fiber cross sections depicted in FIGS. 2A-2C are similar to the optical fiber cross section depicted in FIG. 1A, but have non-circular inner claddings 14. The advantage of non-circular inner cladding 14 is that a non-circular shape can improve the absorption of optical pump power into the core 12.

The optical fiber core 12 is either circular (FIG. 2A), or elliptical, as shown in FIGS. 2B, 2C. An elliptical core 12 may be preferred because it can render polarization maintaining properties to the optical fiber. It is preferred that the aspect ratio of the elliptical core 12 be at least 1.5:1 and more preferably be between 2:1 and 5:1, because these aspect ratios improve birefringence of the core 12, so that the fiber is a polarization maintaining fiber. An optical fiber with an elliptical core having a 2:1 ratio (ratio of major to minor axis) is depicted, for example, in FIG. 2C. Thus, if the rare earth doped core has an elliptical shape, the optical fiber 10 is a polarization maintaining (PM) fiber. The term "polarization maintaining", as used herein, refers to a fiber that can provide polarization maintenance over a fiber length of at least 50 meters.

In order to have polarization maintaining single mode amplifying/laser fiber, the core 12 has an aspect ratio of at least 1.5 to 1 and a numerical aperture NA between 0.05 (for high power laser application) and 0.2 (for lower power application). The numerical aperture NA of the core 12 is defined as $(n_1^2 - n_2^2)^{1/2}$. If the core 12 is not circular, it is preferable that the aspect ratio of the core be between 3:1 and 10:1.

The silica based inner cladding 14 of the multi-clad fiber may have a circular outer perimeter, as shown in FIG. 1A (preferably with an off-center situated core), or a non-circular outer perimeter. The numerical aperture NA of the (pumped) inner cladding 14 defined above is preferably over 0.2.

In general, a double-clad structure that could be used in a fiber laser or in an amplifier includes two claddings. A first (inner) multi-mode cladding 14 acts as a multi-mode pumping core. The inner cladding 14 is adjacent to the core 12 and a second (outer) cladding 16 surrounds the first cladding 14. The core 12 may be either single mode or multi mode at the core lasing wavelength. The inner cladding 14 serves as a waveguide with a high numerical aperture NA for the input (pumping) light. The larger the inner cladding diameter, the more pump light is coupled into the inner cladding from the optical source. The cross-section of the first multi-mode inner cladding ($D_{IN}$ is the shorter dimension of the inner cladding as seen in FIGS. 2A-2C) may be designed to have a desired shape, e.g., matched to the near field shape of the pump source or have any other which increases coupling efficiency of the (pump) light from the light source to the inner cladding. The numerical aperture of the inner cladding 14 must be high enough to capture the output of the light source, such as the laser diode. The gas containing voids 16A situated in the outer cladding 16 significantly increase the NA of the inner cladding 14. Preferably the regional gas filed fraction, i.e., the gas fill fraction of the outer cladding (i.e., total cross-sectional area of the voids divided by total cross-sectional area of the voids containing region of the fiber×100) 16 is between 1% and 75%, more preferably between 2% and 55% and most preferably between 6% and 50%, and typically 6 to 20%. The higher the gas filled fraction (%), the higher is the NA of the inner cladding 14. A typical range of gas fraction within the void containing region of the fiber is between 8% to 50%, which corresponds to an inner cladding NA of 0.2 to 0.8, if the outer cladding is not down doped. The NA of the inner cladding will be higher if the outer cladding is also down-doped, for example with boron or fluorine.

For example, a relatively thin (e.g., having a radial width less than 40 microns, and more preferably less than 30 microns) ring of void containing region 16, can be surrounding the inner cladding 14 of the optical fiber, but not extend entirely to the outer perimeter of the optical fiber. The optical fiber may or may not include germania or fluorine to also adjust the refractive index of the core and or cladding of the optical fiber, but these dopants can also be avoided and instead, the voids alone can be used to adjust the refractive index of the outer cladding with respect to the inner cladding such that pump light is contained within the inner cladding 14 of the fiber, such that the pump light does not leak out of the inner cladding. Using the consolidation techniques disclosed, optical fibers can be formed whose cross-sections exhibit a non-periodic distribution of gas containing voids. By non-periodic distribution, we mean that when one views a cross section of the optical fiber, the gas containing voids are randomly or non-periodically distributed across at least a portion of the outer cladding 16. Cross sections taken at different points along the length of the fiber will exhibit different cross-sectional hole patterns, i.e., various cross sections will have slightly different randomly oriented voids—for example, different hole patterns, distributions, and sizes. These holes (voids 16A) are stretched (elongated) along the length (i.e., parallel to the longitudinal axis) of the optical fiber, but do not extend the entire length of the entire fiber. While not wishing to be bound by theory, it is believed that the voids or holes extend less than a few meters, and in many cases less than 1 meter along the length of the fiber.

Using the hole (void) producing consolidation techniques disclosed herein, it is possible to make optical fibers having cladding regions which exhibit a total fiber void area percent (i.e., total cross-sectional area of the voids divided by total cross-sectional area of the optical fiber×100) greater than 0.01 percent, more preferably greater than 0.05 percent, even more preferably greater than 0.1 percent, even more preferably greater than about 1 percent. For example, the total void area percent in the fiber may be greater than about 5 percent and even greater than about 8 or even 10 percent. The gas containing voids 16A (also referred to as holes or voids herein) in the outer or second cladding regions can be used to lower the refractive index of the outer cladding 16 relative to the inner cladding 14 and thus form the cladding region which guides the pump light along the inner cladding of the optical fiber. By selecting the appropriate soot consolidation conditions, as will be described for example below, a variety of useful optical fiber designs can be achieved. For example, by selecting the maximum void size in the cladding to be less than that of the wavelength of pump light (for example, less than 980 nm, or 1680 nm) which is to be provided to the inner cladding 14, and preferably less than one half of the pump wavelength, highly efficient laser and/or amplification fibers can be achieved without having to use expensive dopants. Consequently, for a variety of applications, it is desirable for the holes to be formed such that at least greater than 80% (and even more preferably greater than 95%) of and preferably all of the holes in outer cladding 16 the optical fiber 10 exhibit a maximum hole width (i.e. maximum cross section Di) which is less than 2000 nm, more preferably 1480 nm or 980 nm, more preferably less than 500 nm, more preferably less than 400 nm, more preferably in some embodiments less than 300 µm, more preferably in some embodiments less than 200 nm, even more preferably in some embodiments less than 100 nm, most preferably less in some embodiments than about 50 nm. Likewise, it is preferable that the mean diameter of the holes in the fiber be less than 2000 nm, more preferably less than 1000 nm, more preferably less than 500 nm, and even more preferably in some embodiments less than 350 nm, and most preferably in some embodiments less than 200 nm, all of which mean diameters are achievable using the methods disclosed herein. The fibers made using the methods disclosed herein can achieve these mean diameters to within a standard deviation of 1000 nm, more preferably to within a standard deviation of 500 nm, and most preferably to within a standard deviation of 200 nm or less. In some embodiments, the fibers disclosed herein, measured in cross-section to the optical fiber length, have less than 5000 holes, in some embodiments less than 1000 holes, and in some embodiments the total number of holes is less than 500 holes in a given optical fiber perpendicular cross-section. Of course, the most fibers will exhibit combinations of these characteristics. Thus, for example, one particularly preferred embodiment of optical fiber may exhibit less than 200 holes in the optical fiber, the holes having a maximum diameter less than 1500 nm and a mean diameter less than 750 nm, although useful and bend resistant optical fibers can be achieved using larger and greater numbers of holes. The hole number, mean diameter, max diameter, void area percent of holes within a void containing portion of the fiber, and total void area percent of holes can all be calculated with the help of a scanning electron microscope at a magnification of about 800× and image analysis software, such as ImagePro, which is available from Media Cybernetics, Inc. of Silver Spring, Md., USA.

As described below in Example 4, we compared fiber with a pure silica outer cladding that has no gas containing voids (Sample A fiber), and a similar fiber (Sample B fiber, see FIGS. 1C and 1D) with oxygen containing voids (6.8% total fiber void area percent, voids with mean diameter of 0.45 µm and standard deviation of 0.21 µm), to analyze the impact of voids 16A on the NA of the core 12. The optical fiber without oxygen containing voids had core NA of 0.262 (measured at about 1380 nm wavelength). The optical fiber with the voids 16A had core NA of 0.344 (measured at about 1380 nm wavelength). Thus, the numerical aperture NA of the core increased by 31% (from 0.262 to 0.344) when the $O_2$ filled voids 16A were added.

EXAMPLES

The invention will be further clarified by the following examples.

Example 1

The optical fiber 10 of example 1 is illustrated schematically in FIGS. 1A and 1B and has a Yb doped core 12, a $GeO_2$-silica inner cladding (refractive index % delta≈0.46) and an outer cladding 16 which doped with fluorine and boron. The refractive index percent (%) delta is defined herein as $(n_i^2 - n_s^2)/2n_i^2$, where i=1, 2 or 3, and $n_s$ is the refractive index of pure silica. The relative refractive index difference (percent delta) of the core 12 (relative to the inner cladding 14) is about 0.56. The outer cladding 16 of this fiber is fluorine/boron doped and comprises $N_2$ containing voids (16% porosity). The Yb-doped fiber core 12 is single-mode for the wavelengths above 1 µm. If the core 12 is doped with Erbium, the optical fiber will be single-mode at lasing wavelength of 1.55 µm. The optical fiber 10 has a relatively low NA (about 0.065) for the core 12, and high NA (0.39, measured at 1380 nm wavelength) for the inner cladding 14. This inner cladding NA is preferably higher than that of the pump-source, allowing high coupling efficiency for the pump light of 90% or better. The small core NA (0.065) enables single mode operation with a large core size (10.5 microns diameter). If the core NA is higher (0.13, for example), the core diameter would have to be smaller (about 5 microns, for example) in order to be single mode. The bigger core diameter and lower core NA allows the core 12 to stay single-mode, while allowing the core to take more pump-power from the inner cladding, and also increases fiber power handling capability. The specific composition for this exemplary optical fiber is:

Core 12: 0.6 wt % $Yb_2O_3$; 4.5 wt % $Al_2O_3$; 3.0 wt % $GeO_2$;
Inner cladding 14: 8.5 wt % $GeO_2$;
Outer cladding 16: 9 wt % B and 2.7 wt % F with 16% porosity ($N_2$ filled voids) within the outer cladding with a mean hole size of 200 nm and a standard deviation of 100 mm. In this example, the relative refractive index deltas $n_5$ and $n_3$ are about −1.5% and −28%, respectively (relative to pure silica).

Fiber 10 can be produced by the outside-vapor-deposition process (OVD). The OVD process is a way of making optical fiber by depositing from the desired vapor ingredients (including silica and the desired dopants) reacting with oxygen in a flame to form the soot-particles on a bait rod, for making fiber soot-preform. The soot-preform is then consolidated into solid transparent glass in a high temperature furnace, after the bait rod is removed. The core/innercladding/outer-cladding compositons are achieved by utilizing different vapor-ingredients for each of the layers in the soot preform forming process. The core/inner cladding performs is generated first, then consolidated, followed by an overclad outside vapor deposition process and then consolidated again. As described in the specification, at least one consolidation step is utilized to introduce gas containing voids into consolidated fiber perform. The final preform is then drawn into double-clad optical fiber by known fiber-drawing method.

Example 2

This optical fiber of this example is illustrated schematically in FIGS. 1A and 1B and has a Yb doped, silica based core 12 which is multi mode at the lasing wavelength of 1100 μm, a pure silica based inner cladding 14 (delta %≈0) and a pure silica outer cladding 16 with 16% porosity in the void (argon gas) containing region. In this example, the relative refractive index deltas $n_5$ and $n_3$ are about 0% and −28%, respectively (relative to pure silica). The NA of the inner cladding 14, is 0.3 (measured at 1380 nm). The refractive index difference (delta %) of the core 12 relative to the inner cladding, 14, is about 0.7. The core 12 and the first section of the inner cladding 14 are produced by an inside-vapor-deposition (IVD) process. The core $GeO_2$—$SiO_2$ soot is deposited inside the glass tube (first section of the inner cladding) and followed by solution Yb-doping of the core soot. The structure is then sintered into a solid preform. The preform is then used as a bait-rod for the OVD process for the outer cladding deposition. As described in the specification, at least one consolidation step is utilized to introduce gas containing voids 16A into consolidated fiber perform.

The specific composition for the optical fiber of the second example is:

Core 12: 0.8 wt % $Yb_2O_3$; 9.5 wt % $P_2O_3$; 5.4 Wt % $GeO_2$;
Inner cladding 14: Pure Silica;
Outer cladding 16: pure silica with 16% porosity (argon containing voids) within the outer cladding with a mean hole size of 300 nm and a standard deviation of 150 nm. In this example, the relative refractive index deltas $n_5$ and $n_3$ are about 0% and −28%, respectively (relative to pure silica).

Example 3

This active optical fiber of example 3 (also illustrated schematically in FIGS. 1A and 1B) has a Yb doped core 12, a silica based, $GeO_2$ doped silica inner cladding 14 having an NA of 0.3 (measured at 1380 nm), and voids containing outer cladding 16 which is doped with Fluorine and Boron. The refractive index difference (% delta) of the core 12 (relative to the inner cladding) is about 0.7. The specific composition for this optical fiber example is:

Core 12: 0.8 wt % $Yb_2O_3$; 9.5 wt % $P_2O_3$; 5.4 Wt % $GeO_2$;
Inner cladding 14: 6 Wt % $GeO_2$;
Outer cladding 16: 9 wt % B and 2.7 wt % F, with 5% porosity (argon containing voids) within the outer cladding with a mean hole size of 300 nm and a standard deviation of 150 nm. In this example, the relative refractive index deltas $n_5$ and $n_3$ are about −1.5% and −28%, respectively (relative to pure silica). The gas filled voids 16A improve the NA of the inner cladding 16 and thus provide a much higher laser pump efficiency, and since pump light stays confined in the fiber they prevents catastrophic failure from pump light leakage, which may result in polymer coating burning and starting on fire.

Example 4

Figure 1C:
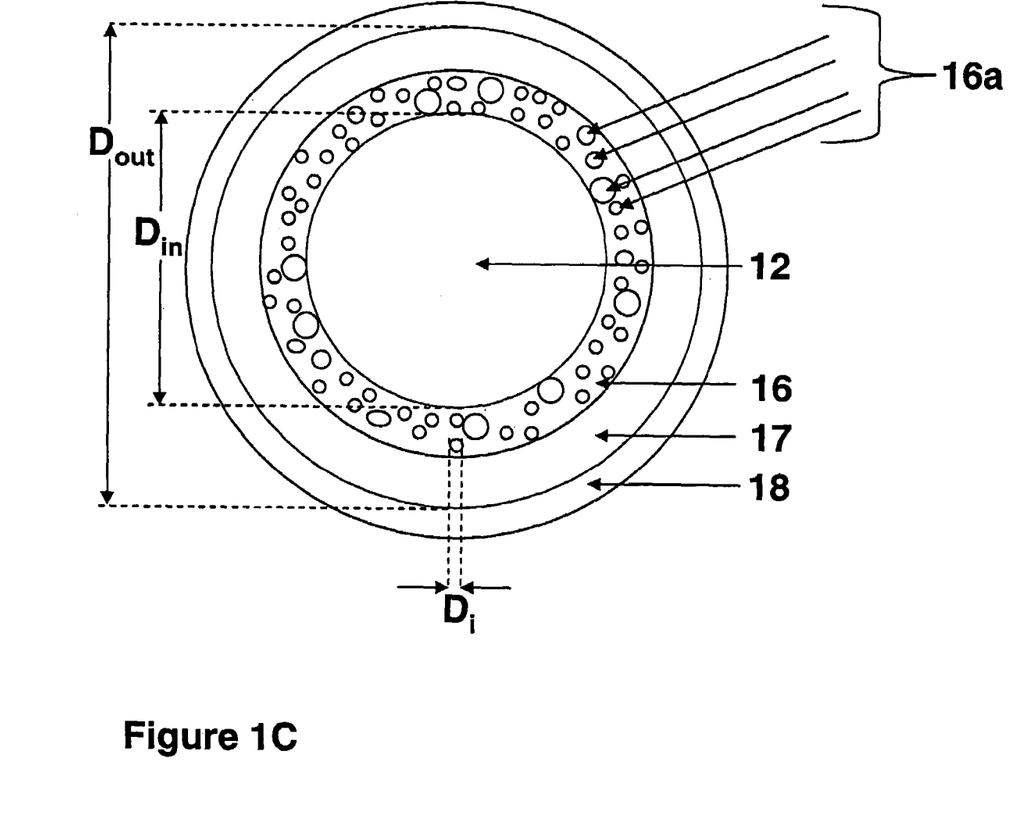
FIG. 1C is a schematic cross sectional view of another embodiment of the present invention.
Figure 1D:
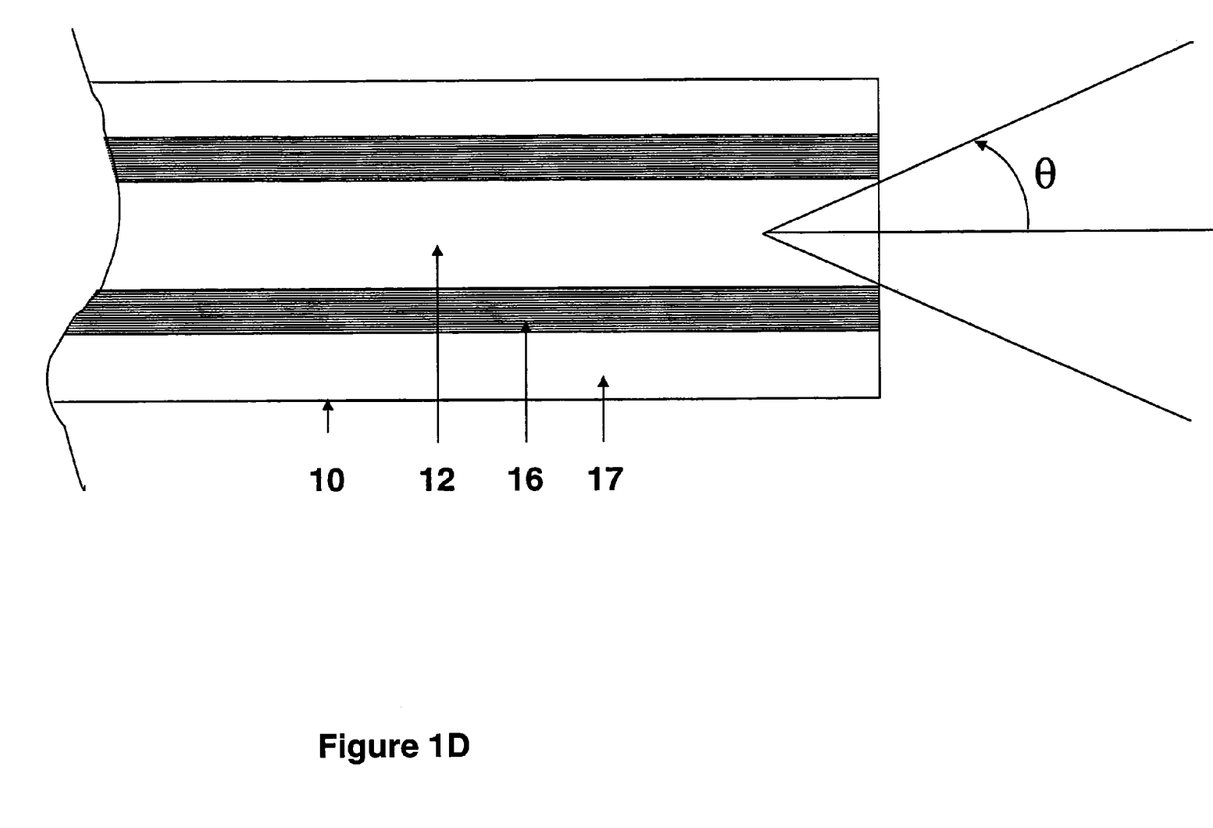
FIGS. 1D and 1E are schematic transverse views of views of two embodiments of the present invention.
Figure 1E:
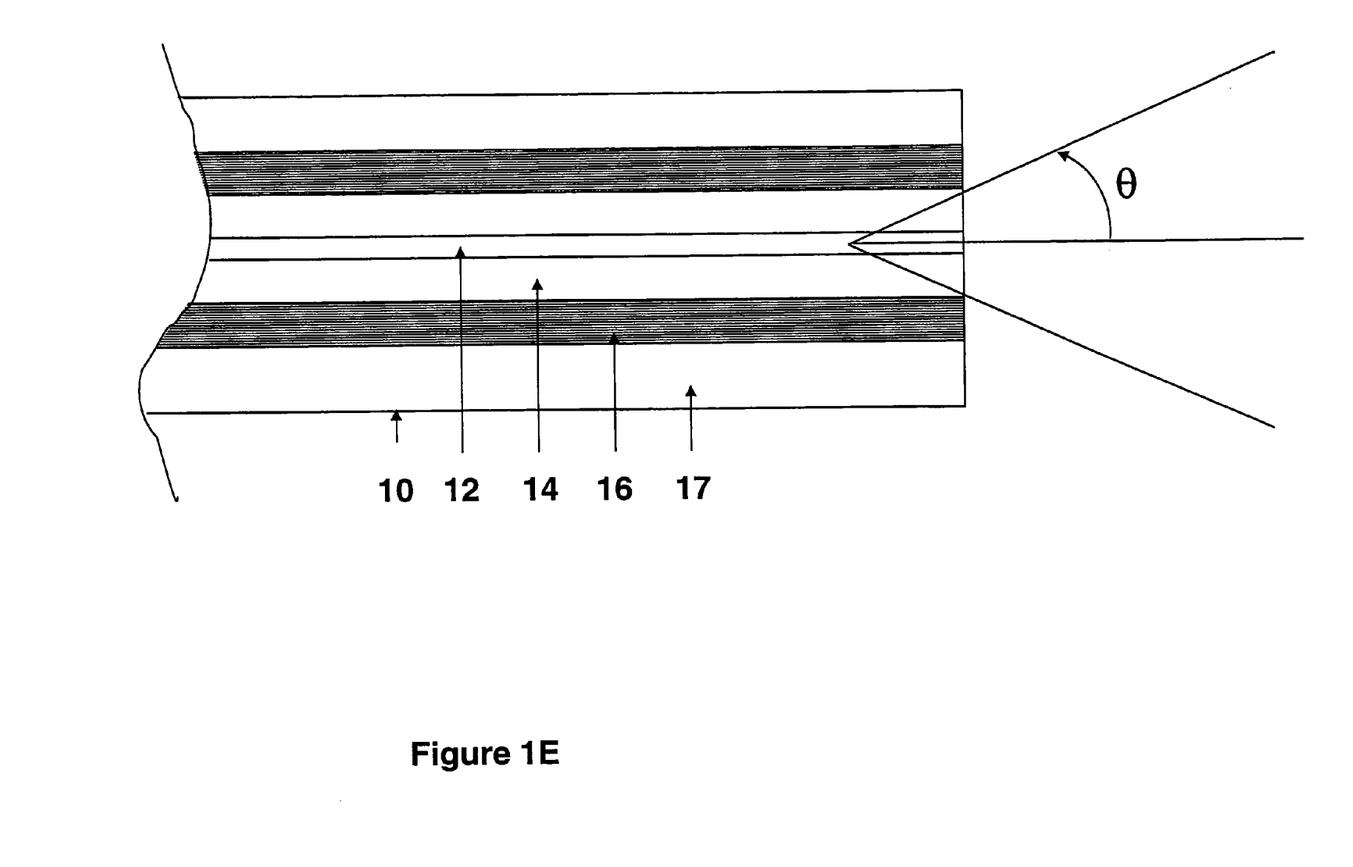

The optical fiber (sample B) in Example 4 is illustrated schematically in FIGS. 1C and 1D. The control fiber (sample A) is similar to sample B fiber, but has no voids in the outer cladding. Sample A and sample B fibers and their performance are described in more detail below. Sample B fiber was manufactured as follows: 1200 grams of $SiO_2$ (0.47 g/cc density) soot were flame deposited onto a 1 meter long×15 mm diameter solid glass cane of $GeO_2$—$SiO_2$ graded index (2 percent delta index (vs. silica) at peak with a parabolic shape). This assembly was first dried for 2 hours in an atmosphere consisting of helium and 3 percent chlorine at 1000° C., followed by down driving at 32 mm/min through a hot zone set at 1500° C. in a 100 percent oxygen atmosphere, then re-down driven through the hot zone at 25 mm/min in the same atmosphere, then final sintered in 100 percent oxygen at 6 mm/min, in order to sinter the soot to a oxygen-seeded overclad blank. The resulting glass blank was placed for 24 hours in an argon purged holding oven set at 1000° C.

Figure 3:
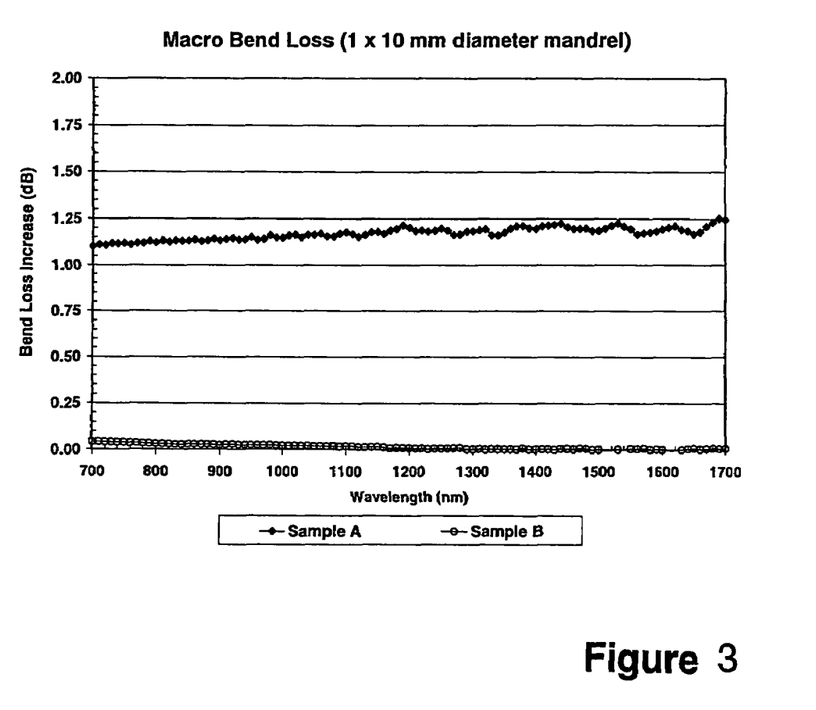
FIG. 3 is a graph of bend performance of an exemplary optical fiber that contains gas filled voids according to one embodiment of the present invention, and a similar fiber that does not contain such voids.

The blank was then drawn to a 10 km length of 125 micron diameter fiber (Sample B fiber) at a rate of 20 m/s using a draw furnace having a hot zone of about 20 cm length and set at approximately 2000° C. SEM image analysis at 800 fold magnification of the end face of a fiber showed a 62.5 micron diameter solid silica-germania core and a 125 micron diameter silica cladding ($n_5$ of about 0%, relative to silica) containing approximately 9.0 volume percent airlines (oxygen, $n_3$=−28% relative to silica) beginning at the core edge and being distributed throughout the cladding to approximately the outer diameter of the fiber, with a mean hole diameter of 0.45 microns diameter the smallest diameter airlines at about 0.03 microns, a maximum diameter of 1.2 microns with a standard deviation of 0.21 microns, and comprising approximately 3000 holes in the fiber cross-section. The total fiber void area percent (area of the holes divided by total area of the optical fiber cross-section×100) was about 6.8 percent. Optical properties for this fiber were less than 20 dB/km, and more specifically 3.00 dB/km, 0.74 00 dB/km and 0.45 dB/Km at 850 nm, 1310 nm and 1550 nm, respectively, when measured as a multimode attenuation. Optical bend performance data (FIG. 3) showed a less than 0.03 dB and less than 0.01 dB increase in attenuation at 850 nm and 1550 nm, respectively, when the fiber was wrapped once around a mandrel having a 5 mm radius (10 mm diameter).

The commercially available control fiber with a 62.5 micron diameter core ($GeO_2$—$SiO_2$ graded index (2 percent delta index (vs. silica) at peak with a parabolic shape), and a solid silica 125 micron diameter outer cladding control fiber without voids (Sample A fiber) was also measured for bend resistance. Optical bend performance (FIG. 3) of this control fiber (Sample A fiber) showed a 1.13 dB and 1.20 dB increase in attenuation at 850 nm and 1550 nm, respectively, when the fiber was wrapped once around a mandrel having a 5 mm radius. These results demonstrate the superior bend performance of a fiber containing voids in the cladding. The control optical fiber (Sample A) without oxygen containing voids had core NA of 0.262 (measured at about 1380 nm). The optical fiber with the voids 16A (Sample B, described above) had core NA of 0.344 (measured at about 1380 nm). Thus, the numerical aperture NA of the core increased by 31% (from 0.262 to 0.344) when the air filled voids 16A were added.

Therefore, using the fiber designs and methods disclosed herein, it is possible to create an optical fiber which exhibits an attenuation increase at the wavelength of interest (for example, 915 nm, 976 nm, 980 nm, 1480 nm and 1550 nm) of less than 1 dB/turn, more preferably less than 0.5 dB/turn, even more preferably less than 0.25 dB/turn, and most preferably less than 0.15 dB/turn when bent around a 10 mm diameter mandrel.

The optical blank for making the fiber of example 4 was also drawn to 300 micron diameter fiber with a void free germania doped silica core of 75 micron radius. This core was surrounded by the void containing silica clad as described above, thus resulting in an optical fiber having a large core and high NA. Either of these 125 or 300 micron diameter fibers are suitable for automotive data communication applications.

Example 5

The optical fiber 10 of example 5 is illustrated schematically in FIGS. 1C and 1D and is designed for use in automotive data communication applications. This fiber has a void free silica core 12 and the core radius of 90 microns, surrounded by a void containing silica cladding, 16, having a radial thickness of 20 microns, comprised of 16% nitrogen containing voids, 16A, with a mean diameter of 200 nm and a standard deviation of 100 nm, which is further surrounded by a void free silica outer cladding, 17, having a radial thickness of 10 microns. The total fiber void area percent (area of the holes divided by total area of the optical fiber cross-section×100) is about 4.4 percent. The NA of the core is 0.3 (measured at 1380 nm). This fiber is suitable for automotive data communication applications.

Preferably the regional gas filed fraction, i.e., the gas fill fraction of the void containing cladding (i.e., total cross-sectional area of the voids divided by total cross-sectional area of the voids containing region of the fiber×100) is between 1% and 75%, more preferably between 2% and 55% and most preferably between 6% and 50%. The higher is the gas filled fraction (%), the higher is the NA of the core 12. Applicants also found the smaller is the size of the voids relative to the wavelength of interest (e.g., source wavelength), the better is optical performance of the fiber, higher is the NA of the high numerical aperture layer (in this example it is the core 12) and the better is the bend performance of the optical fiber 10. Thus, preferably the ratio of $\lambda_{NA}/D_i$ is greater than 2, more preferably greater than 3, more preferably greater than 4, even more preferably greater than 5 and most preferably greater than 10 ($\lambda_{NA}$ is the wavelength for measuring the NA and Di is the mean void diameter). In this example, the relative refractive index deltas $n_5$ and $n3$ are about −0% and −28%, respectively (relative to pure silica).

Example 6

The optical fiber 10 of example 6 illustrated schematically in FIGS. 1C and D and is designed for use in automotive data communication applications. This fiber was manufactured as follows: 500 grams of $SiO_2$ (0.46 g/cc density) soot were flame deposited onto a 1 meter long×15 mm diameter pure silica core cane. This assembly was then sintered, more specifically this assembly was dried for 2 hours in an atmosphere consisting of helium and 3 percent chlorine at 1000° C., followed by down driving at 32 mm/min through a hot zone set at 1500° C. in a 70 percent nitrogen and 30 percent $SiF_4$ (by volume) atmosphere, then re-down driven through the hot zone at 25 mm/min in the same atmosphere, then final sintered in 100 percent nitrogen at 6 mm/min, in order to sinter the soot to a F-doped and nitrogen-seeded overclad blank. The blank was placed for 24 hours in an argon purged holding oven set at 1000° C.

The blank was drawn to 125 micron diameter fiber in a manner similar to Example 1. Optical image analysis at 200 and 500 fold magnification of the end face of a fiber showed about 82 micron diameter solid silica core and a fluorine doped silica (approximately 1.2 weight percent fluorine, $n_5$=−0.4% relative to silica) cladding containing approximately 9.0 volume percent airlines (nitrogen) with a mean hole diameter of 0.73 microns diameter the smallest diameter airlines at 0.03 microns, a maximum diameter of 2.0 microns with a standard deviation 0.40 microns, and comprising approximately 1200 holes in the fiber cross-section. In this example, the relative refractive index delta $n_3$ is about −28% (relative to pure silica). The total fiber void area percent (area of the holes divided by total area of the optical fiber cross-section×100) was about 5.1 percent. Optical properties for this fiber were 16.1 dB/km, 14.5 dB/km and 13.2 dB/Km at 850 nm, 1310 nm and 1550 nm, respectively, when measured as a multi-mode attenuation. Optical bend performance data showed a 1.85 and 0.67 dB increase in attenuation at 850 and 1550 nm, respectively, when the fiber was wrapped once around a mandrel having a 5 mm radius. A control fiber, without voids, was made; $SiF_4$ and He sintering atmosphere was used in the cladding and resulted in a fiber with no voids. Optical image analysis of this control fiber had at 200 and 500 fold magnification of the end face of a fiber showed about 82 micron diameter solid silica core and a fluorine doped silica (approximately 1.2 weight percent fluorine) void-free cladding. Optical bend performance of this control fiber showed a 8.06 dB and 9.33 dB increase in attenuation at 850 nm and 1550 nm, respectively, when the fiber was wrapped once around a mandrel having a 5 mm radius. These results demonstrate the superior bend performance of a fiber containing voids in the cladding. This optical fiber with the voids 16A (described above) has an inner cladding NA of 0.258 (measured at about 1380 nm). The control optical fiber without voids has inner cladding NA of 0.13 (measured at about 1380 nm). Thus, the numerical aperture NA of the inner cladding increases by 98% (from 0.13 to 0.258) when the air filled voids 16A were added. The above optical blank was also drawn to 300 micron diameter fiber and has a void free silica core of approximately 100 microns in radial distance surrounded by the void containing fluorine doped silica clad as described above, thus resulting in an optical fiber having a large core and high NA. Either of these 125 or 300 micron diameter fibers is suitable for automotive data communication applications.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber comprising:
   (i) a silica based core having a first index of refraction $n_1$; and
   (ii) at least one silica based cladding surrounding the core, said at least one silica based cladding having a second index of refraction $n_i$, such that $n_1 > n_i$; said at least one silica based cladding comprising index lowering non-periodic voids containing a gas, wherein at least 80% of said voids have a maximum cross-sectional dimension of less than 2000 nm, and the NA of the fiber layer situated immediately adjacent to and inside said at least one silica based cladding is at least 0.2.

2. The optical fiber according to claim 1, wherein and NA of the fiber layer situated immediately adjacent to and inside said at least one silica based cladding is at least 0.5.

3. The optical fiber according to claim 1, wherein the fiber layer situated immediately adjacent to and inside said at least one silica based cladding is the core, and the core diameter is between 50 μm and 400 μm.

4. The optical fiber according to claim 1, wherein the fiber layer situated immediately adjacent to and inside said at least one silica based cladding is the core, and the core NA is at least 0.4 and the core diameter is between 50 μm and 400 μm.

5. The optical fiber according to claim 1, wherein $\lambda_{NA}/D_i > 2$, where $\lambda_{NA}$ is the wavelength for measuring said NA and Di is the mean void diameter.

6. The optical fiber according to claim 5, wherein at least 80% of said voids have a maximum cross-sectional dimension of less than 500 nm.

7. The optical fiber of claim 1, wherein said mean hole diameter of the voids is less than 500 nm.

8. The optical fiber according to claim 2, wherein $\lambda_{NA}/D_i > 5$.

9. The optical fiber according to claim 1, having a regional gas filled fraction of at least 1%.

10. The optical fiber according to claim 1, having a regional gas filled fraction of at least 5%.

11. The optical fiber according to claim 1, wherein said core has a core diameter of at least 200 nm.

12. The optical fiber according to claim 1, wherein said fiber has a bend loss of less than 0.25 dB/km, when bent around 10 mm diameter mandrel.

13. The optical fiber according to claim 1, wherein said fiber has a core attenuation of less than 20 dB/km at $\lambda=850$ nm.

14. The optical fiber of claim 1, wherein said gas comprises Ar or $N_2$ or $O_2$ or $CO_2$, or mixtures thereof.

15. The fiber according to claim 1 wherein said core is a rare earth doped core; said fiber further comprising a silica based inner cladding surrounding the core, said inner cladding having a second index of refraction $n_2$, such that $n_1 > n_2$; wherein said at least one silica based cladding comprising index lowering non-periodic voids is an outer cladding surrounding the first cladding.

16. The optical fiber of claim 15, wherein the inner cladding diameter is at least 125 μm.

17. The optical fiber of claim 15, wherein
    (i) the core includes, in weight percent:

| | |
|---|---|
| Yb and or Er | 0.1 to 2.5 wt %; |
| P | 0 to 5% wt % |
| Al | 0 to 15 wt %; |
| Ge | 0 to 15 wt %; and |
| F | 0 to 1 wt %; and |

(ii) said inner cladding includes 0 to 20 wt % of Ge.

18. The optical fiber of claim 15, wherein the core is elongated, the core has an aspect ratio of at least 1.5 to 1, the core diameter (along the minor axis) is 5 μm to 50 μm, and said fiber is polarization maintaining (PM) fiber.

19. The optical fiber of claim 15, wherein the core is circular and the core diameter is 9 μm to 30 μm.

20. The optical fiber of claim 15, wherein the inner cladding diameter is 100 μm to 350 μm and the outer cladding diameter is 120 μm to 500 μm.

21. The optical fiber of claim 15, wherein silica based inner cladding has numerical aperture between 0.25 and 0.9.

22. The optical fiber of claim 15 wherein the outer cladding with non-periodically distributed index lowering voids has a thickness of between 10 μm and 100 μm.

* * * * *